United States Patent [19]

Rotherham

[11] Patent Number: 4,653,985
[45] Date of Patent: Mar. 31, 1987

[54] FAN BLADE

[75] Inventor: Alan Rotherham, Westmead, Australia

[73] Assignee: Moulded Plywood Products Pty. Ltd., Girraween, Australia

[21] Appl. No.: 672,372

[22] Filed: Nov. 16, 1984

[30] Foreign Application Priority Data

Nov. 18, 1983 [AU] Australia .................. PG2455

[51] Int. Cl.⁴ .................................. F03D 1/06
[52] U.S. Cl. ........................ 416/229 R; 416/235
[58] Field of Search .......... 416/5, 170 C, 229, 239, 416/243, 238, 237, 235

[56] References Cited

U.S. PATENT DOCUMENTS

| 925,031 | 6/1909 | Russel | 416/5 X |
| 998,897 | 7/1911 | Heath | 416/229 |
| 1,473,066 | 11/1923 | Wells | 416/235 |
| 1,506,522 | 8/1924 | Gansel | 416/170 C X |
| 2,288,917 | 7/1942 | Norris | 416/235 |
| 2,336,012 | 12/1943 | Hackethal | 416/229 X |
| 4,342,072 | 7/1982 | Ranten | 416/5 X |
| 4,465,537 | 8/1984 | Coleman | 416/243 X |

Primary Examiner—Robert E. Garrett
Assistant Examiner—Joseph M. Pitko
Attorney, Agent, or Firm—Fitch, Even, Tabin & Flannery

[57] ABSTRACT

A blade for a ceiling fan, the blade is formed of laminated sheets of timber which are moulded in a press so as to give the blade an aerodynamic shape for efficient use of the rotary power provided by the motor of the ceiling fan.

2 Claims, 4 Drawing Figures

U.S. Patent  Mar. 31, 1987  4,653,985
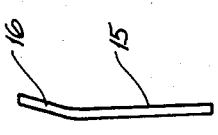
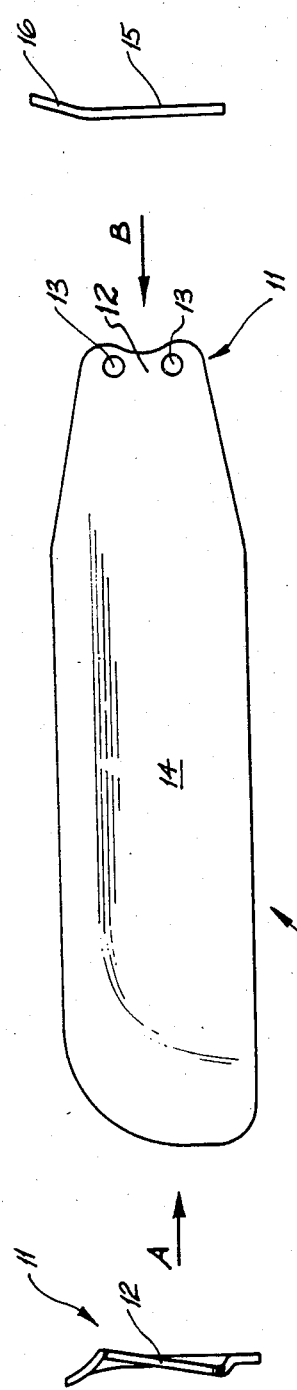
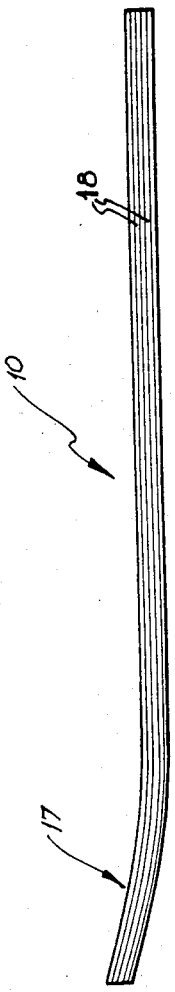
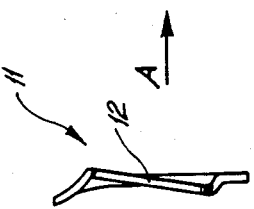

FAN BLADE

The present invention relates to fan blades and more particularly but not exclusively to fan blades for ceiling fans.

Conventionally, fan blades for ceiling fans have been constructed of sheet metal or, alternatively, from generally planar sheets of timber. The metal blades have the disadvantage that they are generally heavy and accordingly increase the inertia of the rotating means to be moved by the motor of the fan. This inertia problem is aggravated by the length of the blades. This has two consequences in that firstly the size of the motor must be increased in order to overcome the inertia and secondly, this increased inertia is dangerous should the blade strike a person. On the other hand, the timber blades, although not having the inertia problems of the metal blades, have the problem that they have not been shaped to provide the most efficient air movement for the power input by the motor.

The metal blades mentioned above have the advantage that they are easily shaped and provide sufficient strength for the elongated blades. On the other hand, the timber blades have been too expensive to shape and although provide sufficient strength, have been unable to provide a suitable efficient aerodynamic configuration.

In view of the above there is considerable demand for a blade construction which ameliorates the above disadvantages. More particularly, there is considerable demand for a blade having sufficient strength, minimum inertia and providing a desired aerodynamic configuration to maximise airflow with respect to power input by the motor driving the fan.

There is disclosed herein an elongated fan blade for a ceiling fan having a motor from which the blade in use is to extend radially so as to be driven thereby about a rotational axis of the motor, said blade being of a laminated structure formed from timber sheets which in use extend generally transverse of said axis, and wherein said blade is shaped so as to have a non-planar configuration to aid in efficient use of rotary power provided by the motor in producing an air current.

It is the object of the present invention to overcome or substantially ameliorate the above disadvantages.

There is disclosed herein a blade for a ceiling fan, said blade being formed of laminated timber sheet material.

A preferred form of the present invention will now be described by way of example with reference to the accompanying drawings wherein:

FIG. 1 is a schematic plan view of a blade for a ceiling fan;

FIG. 2 is a schematic sectioned side elevation of the blade of FIG. 1;

FIG. 3 is a schematic end view of the blade of FIG. 1 as seen in the direction A; and FIG. 4 is a schematic end view of the blade of FIG. 1 as seen in the direction B.

In FIGS. 1 to 4 there is schematically depicted a fan blade 10 having an end 11 with a generally planar portion 12 with apertures 13 enabling attachment of the blade 10 to the hub of a motor. As can be seen from FIGS. 2, 3 and 4 the blade 10 is not totally planar and has a main body 14 providing a leading edge, as best seen in FIG. 1. The body 14 has a generally planar portion 15 with an inclined portion 16 at the trailing edge of the blade 10 which, in operation, would extend downwardly from the planar portion 15. Additionally, the blade 10 would have a downwardly inclined end portion 17 as best shown in FIG. 2.

The abovedescribed configuration of the blade 10 makes efficient use of movement of the blade 10 through a volume of air to cause movement thereof.

The abovedescribed blade 10 is constructed from laminated timber sheets 18 extending generally within the plane of the blade 10. The blade 10 may include two or more, but preferably 5, sheets of timber material and would be formed by placing the sheets in a press, with the sheets being bonded together during the pressing operation. Simultaneously the laminated structure would be formed into the desired configuration.

As can be seen from FIGS. 1 and 2 the sheets 18 will extend generally normal to the axis about which the blade 10 is to rotate.

What I claim is:

1. An elongated fan blade having a longitudinal axis, said blade being of a laminated structure and comprisng a plurality of sheets of wood, said sheets being deformed from a planar configuration so that said blade is nonplanar and is of substantially uniform thickness over substantially its entire area, the blade having a generally planar end portion for mounting of said blade, a main body portion of generally planar configuration which provides a leading edge for the blade and which is inclined with respect to said end portion about said longitudinal axis, and a trailing edge portion which is inclined downwardly from said main body portion to aid in efficient use of said blade.

2. The blade of claim 1 wherein said blade is formed from five of the timber sheets.

* * * * *